Oct. 26, 1954  H. ZIEBOLZ  2,692,581
PNEUMATIC SAFETY DEVICE
Filed Sept. 11, 1948  2 Sheets-Sheet 1

INVENTOR
HERBERT ZIEBOLZ
BY
ATTORNEYS

Oct. 26, 1954  H. ZIEBOLZ  2,692,581
PNEUMATIC SAFETY DEVICE
Filed Sept. 11, 1948  2 Sheets-Sheet 2

INVENTOR
HERBERT ZIEBOLZ
BY
ATTORNEY

Patented Oct. 26, 1954

2,692,581

UNITED STATES PATENT OFFICE 2,692,581

PNEUMATIC SAFETY DEVICE

Herbert Ziebolz, Chicago, Ill., assignor to Askania Regulator Company, Chicago, Ill., a corporation of Illinois Application September 11, 1948, Serial No. 48,853

1 Claim. (Cl. 121—38)

The present invention relates to safety devices for a system wherein actuation of position controlled elements is effected by fluid pressure. Such systems are typified by control systems of various sorts, wherein control is maintained of procedures or processes by means of one or more valves, the position or respective positions of which are selected by variations in pressure exerted upon pressure-responsive actuating devices controlling the respective valves actuated by a pneumatic pressure system. The pressure so exerted upon the actuating devices may be controlled in any suitable way either automatically or manually, by individual or multiple controls for plural devices, or by remote control of plural devices from a central station or individual station control.

In such systems there is always the danger that the actuating fluid pressure source may fail, or that pressure supply to any individual element may fail independently of supply, and since normally the valves or other elements are spring loaded, that is to say are provided with springs that oppose the forces exerted on the elements by the pressure fluid, the result of failure of pressure fluid exerted upon any or all of the devices is that the springs move the controlled elements to extreme positions. This unintended actuation of the controlled devices invariably results in upset of the system and attendant inconvenience, and may result in damage or highly dangerous conditions. In chemical industries, for example, disasterous explosions may result from unintended spring actuation of pressure controlled valves occurring upon failure of the pressure fluid control system or upon failure of supply to any valve or group of valves operated by a common control pressure line.

The primary object of the present invention is to provide automatic safety means that will, in case of failure of a pressure fluid supply that normally positions one or more movable devices or elements, actuate an auxiliary control arranged to substitute auxiliary controlling means that will automatically safeguard the system from the harmful effects that otherwise would result from loss of control attending the pressure failure.

Another object is the provision of such an automatic safety means that is very flexible in that it permits various types of automatic control operations to be instituted upon failure of the control pressure, so that it readily may be adapted to required operation of any particular system.

Another object is the provision of automatic safety means that will, in case of a failure of controlling pressure exerted on a movable element in opposition to a resiliently applied loading force, act to maintain such element substantially in the position that it occupied at the time of such pressure.

Figure 1:
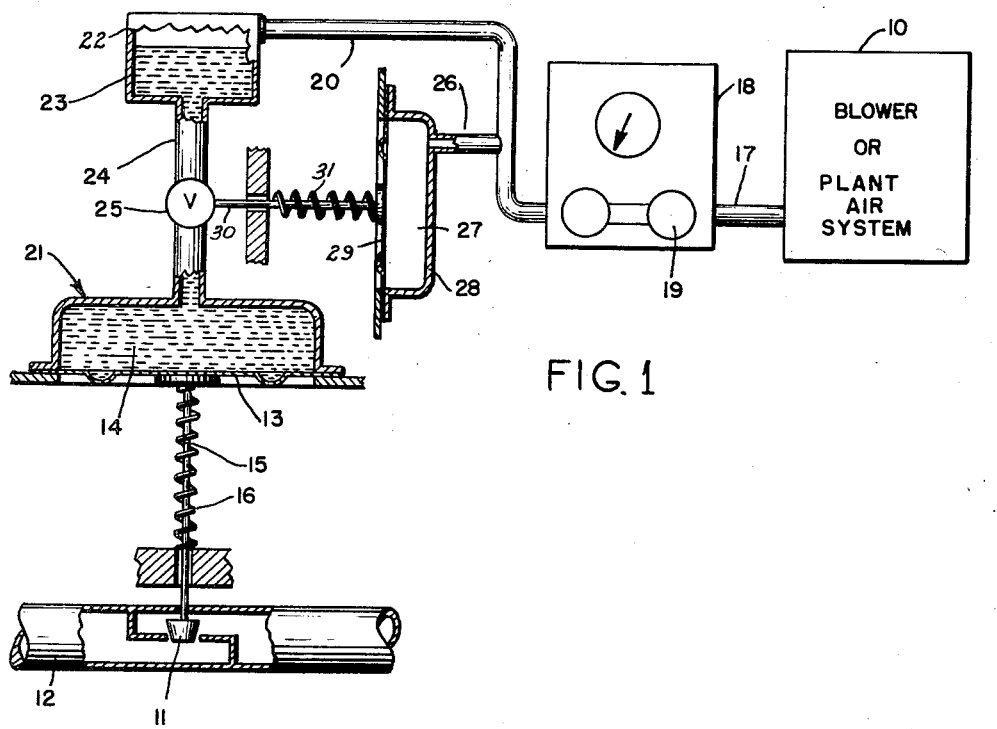
Fig. 1 is a diagrammatic illustration of a system embodying the invention.

Describing the drawings in detail and referring first to Fig. 1, a source of fluid pressure is designated 10 and may comprise a blower or other source of supply such as a main air pressure supply for an industrial plant. Assuming that the movable element comprises a valve 11 controlling flow of a fluid stream through a pipe 12, a fluid pressure responsive actuator comprises a flexible diaphragm 13 that closes one side of an expansible chamber 14. A plunger rod 15 connects the diaphragm with the valve in such manner that increased pressure within the chamber 14 tends to move the valve 11 toward a closed position. A loading spring 16 is arranged to oppose the force of fluid pressure acting internally on the diaphragm 13 to expand the chamber. This spring acts to return the diaphragm and move the valve toward open position upon decrease of the pressure exerted in chamber 14. By means of a conduit 17, pressure from the source 10 is supplied to the actuator, the pressure exerted on the diaphragm 13 being controlled by a controller assembly 18 that includes a variable pressure reducing valve 19 which may be of any suitable arrangement. The unit 18 also may contain an indicating or recording device. The conduit 17 constitutes an input to the device 18 and a second conduit 20 comprises an output wherein the pressure is controlled by the valve 19. Obviously the valve 19 may be actuated in any suitable manner, either automatically or manually, and may comprise an individual control station or may be actuated by remote control from a central control station and as a part of a control system comprising other similarly actuated valves.

Between the control unit 18 and the valve actuating unit, designated generally 21, is an automatic emergency control arrangement. This arrangement includes a chamber forming element 22, the chamber 23 of which comprises in effect an enlargement of the conduit 20 and which is connected to the expansible chamber 14 by a restricted passage 24. Valve 25 controls the passage 24, serving to either provide communication between the chambers 14 and 23 or cut off such communication and effectively seal the expansible chamber 14 within which the control pressure is exerted to determined position of the valve 11. The expansible chamber 14, the passage 24 and a portion of the chamber 23 are filled with a body of incompressible fluid, such as oil. Such fluid serves as a means of transmitting to the chamber 14 and diaphragm 13 the fluid pressure exerted within the chamber 23 by the controlled output pressure of the unit 18. It will be seen that, assuming a certain pressure to be exerted within the chamber 23 upon the fluid, an equal pressure will be exerted on the diaphragm 13 by the fluid, and this pressure exerted in opposition to the force of the loading spring 16 will determine the position of the valve 11 and the rate of flow within the conduit 12. It also will be appreciated that closing of the valve 25 will serve to fix the pressure in chamber 14 and thus fix the valve 11 in the position that it occupied at the time of closing the valve.

The described automatic safety device comprises a pressure sensitive control that is actuated by the pressure existing in the control system at a suitable location. In Fig. 1 this location is taken as being the output of the unit 18. Branch pipe 26 is connected with the output pipe line 20 and is connected with the expansible chamber 27 of a relay diaphragm assembly. The diaphragm 29 of this assembly, which constitutes the movable wall of the expansible chamber 27, controls the position of the cutoff valve 25 through a plunger rod 30. The assembly 28 and valve 25 are so arranged that normal operating pressures within the chamber 27 maintain the valve 25 open permitting flow of the fluid between chambers 14 and 23 under influence of variations of the controlled output pressure of the unit 18. A loading spring 31 opposes the pressure acting within the chamber 27 and has such characteristics that upon decrease of such pressure to a predetermined minimum, the spring will act to return the rod 30 and diaphragm 29, thereby closing the valve 25 to stop communication between the chambers 14 and 23. This action will serve to maintain the valve 11 in the position that it occupied at the time the pressure of the output line 20 decreased to the predetermined minimum.

It will be noted that the cross-sectional area of passage 24 is restricted as compared to the corresponding areas of the chambers 23 and 14, within which the control and return forces are exerted. This restriction provides a dash pot action, which in case of sudden decrease of control pressure delays spring return of the diaphragm and plunger rod, but permitting their normal movement under controlled variations of the operating pressure. Upon sudden decrease in pressure in the control line 20, the relay assembly 28 will operate rapidly as compared to the relatively slow return action of the main control diaphragm 13, due to the restrictive effect of the passage 24, thus providing a closing of the valve 25 before material movement of the valve 11 can occur.

Figure 2:
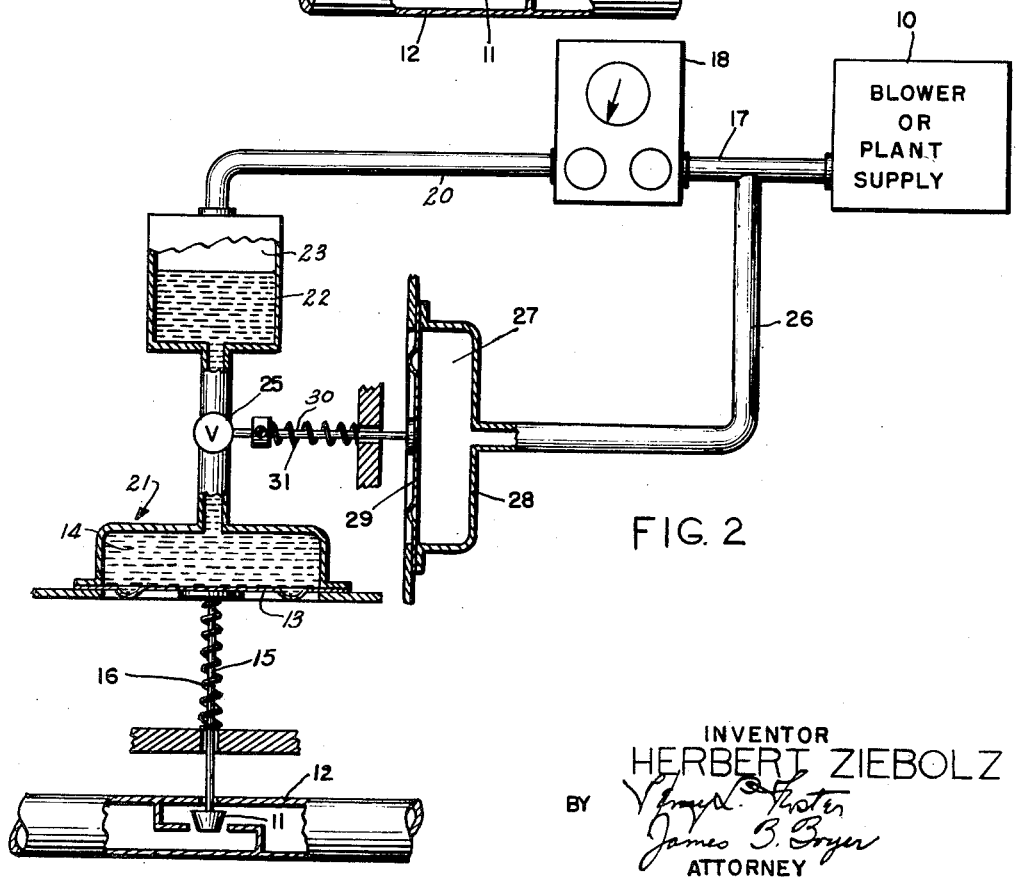
Fig. 2 is a similar illustration of a slightly modified system.

The system disclosed by Fig. 1, wherein the relay pipe line 26 is connected to the output side of the control unit 18, is based upon the concept of controlling the valve from the output or controlled valve actuating pressure. In Fig. 2 a system is disclosed for effecting automatic operation of the safety device by means of the input pressure of the control unit, or pressure of the main supply 10.

In Fig. 2, the various elements of the system are designated by the same numerals as those of Fig. 1 and correspond in arrangement to similar elements of the system of Fig. 1 with the exception that the pressure pipe 26, which provides control of auxiliary diaphragm assembly 28, is connected to the supply line 17, between the main supply 10 and the control unit 18. In this system, the assembly 21 is maintained in operation so long as the main supply 10 provides fluid pressure above a predetermined minimum. Upon failure of the main supply or upon decrease of its pressure to predetermined minimum, the safety system operates in the manner described above.

As a practical example of comparison of the two types of system and their operation, the system of Fig. 1 may be so arranged that over a range of variable pressure between say two and fifteen pounds, which comprises the range of actuating pressure for moving the valve 11 between its two extreme positions, the pressure within the auxiliary chamber 27 will be sufficient to maintain open the valve 25 against the loading action of spring 31. Should the pressure fall to a predetermined minimum below the operating range, say to one pound per square inch, the spring 31, being sufficiently powerful to overcome the thrust of the diaphragm 29, will close the valve 25 and provide the indicated operation. The system of Fig. 2 is so designed, and the operating characteristics of the auxiliary assembly comprising the diaphragm 29 and return spring 31 are such, as to cause a closing of the valve at a materially higher pressure, say for example seventeen pounds per square inch, which may be taken as the minimum safe pressure level of the plant system necessary to proper control of the valve 11.

Selection between these two types of system depends on many considerations, for example, the desirability of effecting the automatic control operation only upon failure of the entire plant air system, as against the desirability of imposing emergency control on an individual valve when its individual controlling pressure fails. Obviously, the control of Fig. 1 may be supplied to a gang of valves that all are controlled by a single unit such as 18.

Figure 3:
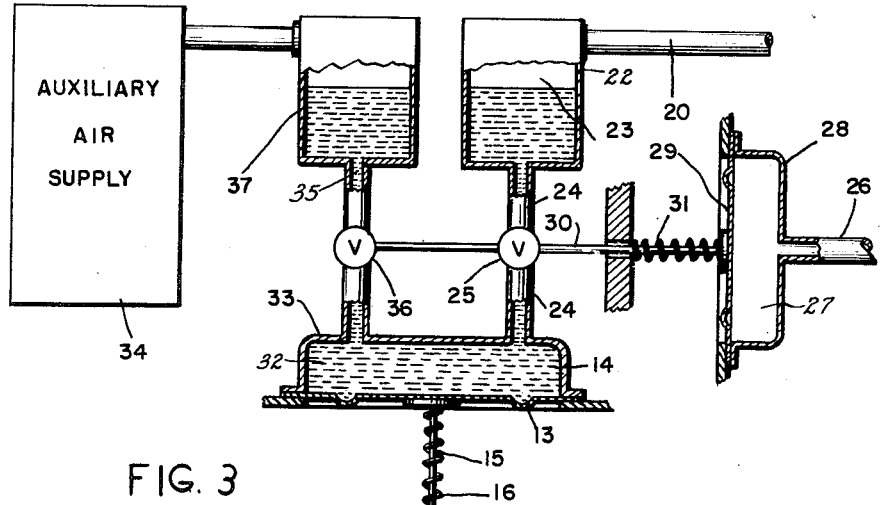
Fig. 3 is a similar view of a system comprising a different embodiment of the invention.

In certain instances, it may be desirable to effect some programming operation of the controlled removable element upon failure of the pressure that controls its position. A system for accomplishing such control is shown in Fig. 3. In this system the movable element to be positioned again comprises a valve 11, and it is assumed that the system in which such valve is used is such that upon failure of control due to failure of pressure, it is desirable to close the valve rather than maintain it in the particular position it occupied upon failure of control. For such purpose, the expansible chamber 32 of the valve controlling assembly 33 may be connected to an auxiliary control means, such as an emergency source of fluid pressure 34. Such connection is shown as being by means of a passage 35 having a controlling valve 36 and communicating with a pressure chamber 37. The body of incompressible fluid is sufficient in volume to fill expansible chamber 14, both passages 24 and 35, and part of each chamber 23 and 37. Auxiliary pressure constantly is exerted within chamber 37 by the emergency supply source 34. Normally the valve 36 is closed to prevent exertion of such auxiliary pressure on diaphragm 13. The valve 36 controlling passage 35 is connected by an extension of the rod 30 to be opened when the valve 25 is closed upon actuation of the emergency assembly by reduction of the pressure. Obviously, such a system may be arranged so that the valve 11 will be opened to its full extent upon failure of the control pressure, or closed or opened gradually, or automatically operated in any other desirable manner to protect the system or accomplish some other desired result.

Figure 4:
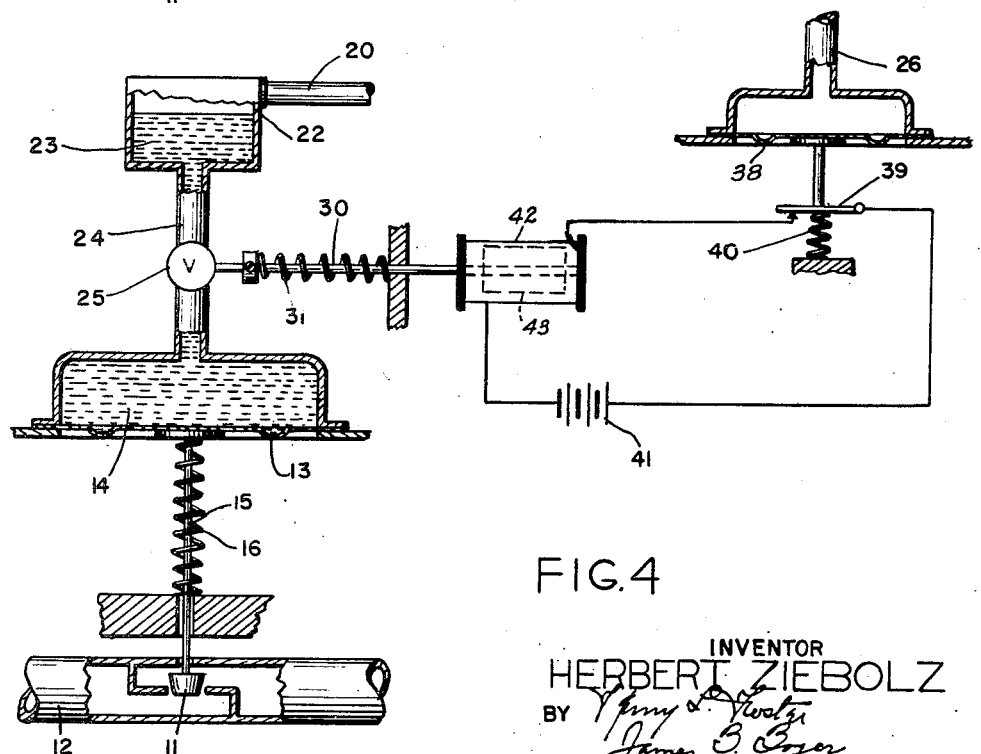
Fig. 4 is a similar illustration of a system embodying the invention and provided with a different type of automatic control-substitution relay.

Fig. 4 discloses a system by means of which operation of the automatic control may be rendered very sensitive. Instead of operating the auxiliary control valve 25 directly by the pressure of the supply system, an electrical relay is used. This relay comprises a sensitive and quick acting combination of a diaphragm 38 that is urged by pressure of the system, introduced through pipe 26, to maintain closed a relay switch 39 that is biased toward open position by a loading spring 40. Upon decrease to a preselected minimum of the pressure acting upon the diaphragm 38, the switch 39 is opened, thereby interrupting an electric circuit that includes a source of current 41 and a solenoid coil 42. The solenoid coil is so arranged relative to a magnetically permeable core 43 that is attached to the end of the plunger rod 30, as to maintain open the valve 25. Upon opening of the switch by decreasing of control pressure, the solenoid coil 42 will be deenergized, permitting the loading spring 31 to close the valve 25 and, in the arrangement shown, fix the valve 11 in the position that it occupies at the time the control pressure decreased beyond the permissible minimum for which the release assembly is adjusted.

From the above it will be seen that the invention provides a simple, efficient and inexpensive means of safeguarding a system including fluid pressure controlled movable elements against damage or inconvenience resulting from uncontrolled movement of such elements upon loss of control pressure. It is to be understood that the flexible nature of the invention permits many modifications and embodiments, and the scope of the protection herein sought is to be determined by the appended claim.

I claim:

In means for controlling the position of a movable element in response to variation in magnitude of pressure of a fluid, and including a main fluid motor having an expansible chamber motor and a wall movable in one direction by pressure exerted within said chamber and a spring biasing said wall in the opposite direction, a conduit for connection to a variable pressure control system, connected with said motor and enclosing a passage that is in communication with said chamber, and a valve connected in said conduit and having a body movable between positions wherein respectively it blocks and clears said passage; a second conduit for connection to an auxiliary fluid pressure source, connected to said motor and enclosing a second passage communicating with said chamber, a second valve connected in said second conduit and having a valve body movable between positions wherein respectively it blocks and clears said second passage, a body of liquid filling said chamber and said passages at least as far as said valves, an auxiliary fluid motor having a chamber, a wall movable in one direction by pressure exerted therein and spring means biasing it to move in the opposite direction upon decrease of such pressure below a preselected magnitude, mechanism operable by movement of said auxiliary motor wall in said one direction to move said first and second valve bodies respectively to their passage-clearing and closing positions and by its movement in said opposite direction to move them respectively to their passage-blocking and passage-clearing positions, and a third conduit for connection to a control system to which said first conduit is connected, connected with said auxiliary motor and enclosing a passage communicating with the expansible chamber of the latter said motor.

References Cited in the file of this patent

UNITED STATES PATENTS

| Number | Name | Date |
|---|---|---|
| 509,992 | Wood | Dec. 5, 1893 |
| 1,163,541 | Hultin | Dec. 7, 1915 |
| 2,208,451 | Eaton | July 16, 1940 |
| 2,323,839 | Nixon | July 6, 1943 |
| 2,336,808 | Simon | Dec. 14, 1943 |
| 2,339,469 | Emanuel | Jan. 18, 1944 |
| 2,397,670 | Krugler | Apr. 2, 1956 |

FOREIGN PATENTS

| Number | Country | Date |
|---|---|---|
| 407 | Great Britain | Feb. 12, 1857 |
| 1,875 | Great Britain | Feb. 2, 1889 |
| 551,497 | Great Britain | Feb. 25, 1943 |